(12) United States Patent     (10) Patent No.:    US 12,583,465 B2

Engels et al.          (45) Date of Patent:     Mar. 24, 2026

(54) METHOD FOR REDUNDANT MONITORING OF DRIVING FUNCTIONS

(71) Applicant: Robert Bosch GmbH, Stuttgart (DE)

(72) Inventors: Stefan Engels, Ostfildern (DE); Zhiyi Xu, Leonberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 82 days.

(21) Appl. No.: 18/598,669

(22) Filed: Mar. 7, 2024

(65) Prior Publication Data

US 2024/0308532 A1     Sep. 19, 2024

(30) Foreign Application Priority Data

Mar. 14, 2023    (DE) ...................... 10 2023 202 272.9

(51) Int. Cl.
*B60W 50/02*      (2012.01)
*B60W 50/029*    (2012.01)

(52) U.S. Cl.
CPC ...... *B60W 50/0205* (2013.01); *B60W 50/029* (2013.01); *B60W 2050/021* (2013.01); *B60W 2050/0292* (2013.01)

(58) Field of Classification Search
CPC ... B60W 2050/021; B60W 2050/0292; B60W 50/0205; B60W 50/023; B60W 50/029
See application file for complete search history.

(56) References Cited

U.S. PATENT DOCUMENTS

2024/0051554 A1*   2/2024   Ko .................... B60W 60/0015
2024/0300502 A1*   9/2024   Lee ................... B60W 50/0205

FOREIGN PATENT DOCUMENTS

DE        4133268 A1    4/1993
DE   102020121244 A1    2/2022
EP       3715206 A1    9/2020

* cited by examiner

*Primary Examiner* — Wade Miles
*Assistant Examiner* — Zachary Joseph Wallace
(74) *Attorney, Agent, or Firm* — NORTON ROSE FULBRIGHT US LLP

(57) ABSTRACT

A method for redundant monitoring of driving functions of an automatedly driving motor vehicle, with a first control system. The first control system includes a first control unit, a first actual-value sensor and a first controller. Based on ascertained actual values of the first actual-value sensor and control specification values, the first control unit controls the first controller with control values. A redundant second control system includes a second control unit, a second actual-value sensor, and a second controller. The second controller is controllable via the second control unit with control values ascertained based on ascertained actual values of the second actual-value sensor and control specification values. The method includes measuring the actual values using the second actual-value sensor, comparing the actual values to the control specification values for the second control unit, determining a deviation, and ascertaining a defect in the first control system depending on the deviation.

7 Claims, 2 Drawing Sheets

METHOD FOR REDUNDANT MONITORING OF DRIVING FUNCTIONS

CROSS REFERENCE

The present application claims the benefit under 35 U.S.C. § 119 of German Patent Application No. DE 10 2023 202 272.9 filed on Mar. 14, 2023, which is expressly incorporated herein by reference in its entirety.

FIELD

The present invention relates to a method for redundant monitoring of driving functions of an automatedly driving motor vehicle. The present invention also relates to a device for carrying out such a method.

BACKGROUND INFORMATION

Nowadays, the automotive industry is strongly driven by the trend toward higher levels of automated driving. More and more vehicles are already equipped with SAE L2 or even L3 systems. Up to the SAE L2 system, the driver can still be considered as a backup responsible for the control of the vehicle. In the event of a system failure, the driver can take control immediately. In contrast, with the SAE L3 to L5 systems, a delayed takeover by the driver is permitted or the driver is partially no longer responsible for the control of the vehicle. The automated driving system must be able to handle failures and to keep operational during a minimal risk maneuver. For this reason, a fail-operational concept is required for safety-relevant systems, such as steering, braking, etc. Corresponding concepts are described in the related art.

German Patent Application No. DE 10 2020 121 244 A1 describes a fail-operational system for a vehicle, with a plurality of redundant component pairings, wherein each component pairing comprises a main component at a main system level and a replacement component at a replacement system level. The main components are configured to control a vehicle function in normal operation, the replacement components being configured to control the vehicle function in fault mode, wherein the main components and the replacement components each provide a cascaded control of the vehicle function. The component pairings are connected to one another by a redundant communication link.

An object of the present invention is to provide a method for redundant monitoring of driving functions of an automatedly driving motor vehicle, with which redundant monitoring of a control system is provided in a simple manner. In addition, a device for carrying out such a method is provided according to the present invention.

The object may be achieved by a method for redundant monitoring of driving functions of an automatedly driving motor vehicle according to the present invention. A device for carrying out such a method is provided according to the present invention. Preferred embodiments of the present invention are disclosed herein.

SUMMARY

The present invention provides a method for redundant monitoring of driving functions of an automatedly driving motor vehicle. According to an example embodiment of the present invention, the automatedly driving motor vehicle comprises a first control system comprising a first control unit, a first actual-value sensor and a first controller, wherein, on the basis of ascertained actual values of the first actual-value sensor and control specification values, the first control unit controls the first controller with control values. The automatedly driving motor vehicle additionally comprises a redundant second control system comprising a second control unit, a second actual-value sensor and a second controller, wherein the second controller can be controlled via the second control unit with control values ascertained on the basis of ascertained actual values of the second actual-value sensor and control specification values.

The control specification values are values that specify how the motor vehicle is to drive. In an automatedly driving motor vehicle, these values preferably come from a virtual driver. According to these specifications, the control unit generates control values for the controller. The redundant control system is redundant in that it can take over the corresponding driving function of the first control system in the event of a failure.

The method according to an example embodiment of the present invention comprises the steps of measuring the actual values by means of the second actual-value sensor, comparing the actual values to the control specification values for the second control unit, determining a deviation between actual values and control specification values for the second control unit, and ascertaining a defect in the first control system if the deviation is above a specified threshold value.

In order to check the first control system, the actual values are thus simply compared in the second control system to the target values. An impermissible deviation can be used to ascertain whether the first control system works properly. A redundant status line is thus not necessary. With this method, no further elements are necessary at all for redundant monitoring, so that redundant monitoring of the first control system is possible in a simple manner.

In a preferred embodiment of the present invention, after ascertaining a defect, the first control system is deactivated and the driving function is taken over by the redundant second control system. Deactivation in the event of a defect prevents further malfunction of the first control system. Through the takeover by the second control system, the safety of the automatedly driving motor vehicle is again assured. Accordingly, a fail-operational concept is provided, in which a driver does not have to intervene in the event of a fault. This also prevents the motor vehicle from having to perform an emergency stop in the event of a fault. As a result, the high requirements of the level of automation can be fulfilled.

In a further preferred embodiment of the present invention, the second control system assists the first control system in adjusting the control values for predetermined driving tasks. Assistance in this respect is understood to mean that both the controller of the first control system and the controller of the second control system set the control values. Although the first control system could also perform the driving tasks by itself, the control specification values can be achieved more quickly through assistance by the second control system so that the controlling speed can be increased.

If the second control unit does not receive a status message from the first control unit and the deviation between actual values and control specification values continues to be below the defined limit value, a defect of a status line between the first and the second control unit is preferably deduced. This method step can already contain the specific fault. This simplifies a subsequent repair.

The present invention additionally provides a device for carrying out the method. According to an example embodiment of the present invention, the device comprises a first control system comprising a first control unit, a first actual-value sensor and a first controller, wherein the first control unit is designed to control the first controller with control values ascertained from actual values of the first actual-value sensor and from control specification values. The device additionally comprises a redundant second control system comprising a second control unit, a second actual-value sensor and a second controller, wherein the second control unit is designed such that the second controller can be controlled with control values ascertained from actual values of the second actual-value sensor and from specification values, and wherein, via the second control unit, a defect of the first control system can be detected on the basis of the actual values of the second actual-value sensor and the control specification values. No further redundant lines are thus necessary for the redundant monitoring by the device, so that a corresponding device can be designed in a simple manner. With such a device, the advantages mentioned with respect to the method are substantially achieved.

In an advantageous development of the present invention, the first and second control systems are control systems for steering, a brake, or a drive. The method according to the present invention can thus be used for various control systems in the motor vehicle so that redundant monitoring lines do not have to be provided for these control systems. These control systems can thus be provided simply and economically.

Exemplary embodiments of the present invention are shown in the figures and explained in more detail in the following description.

DETAILED DESCRIPTION OF EXAMPLE EMBODIMENTS

Figure 1:
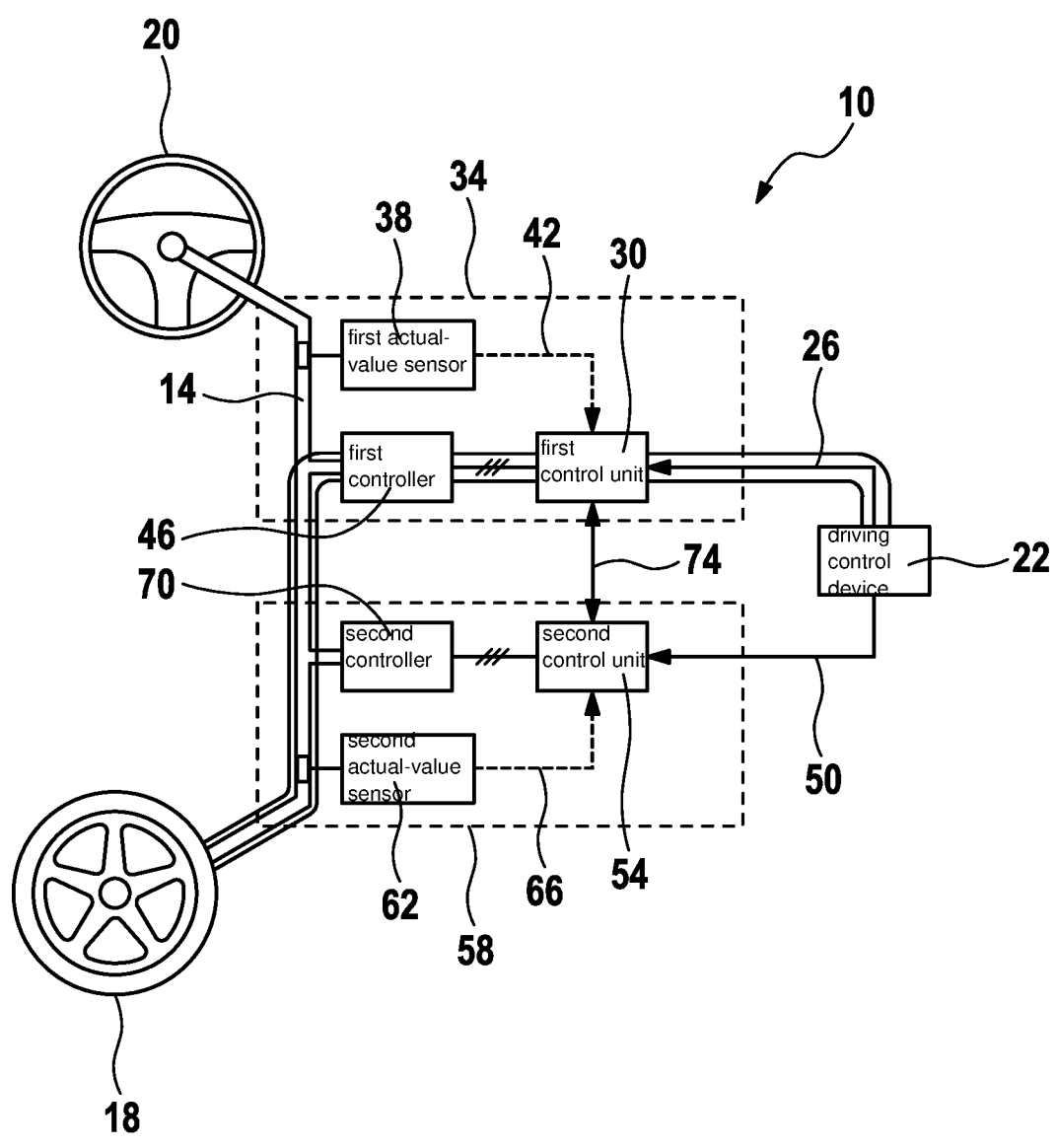
FIG. 1 shows an exemplary embodiment of a device for carrying out the method according to the present invention.

FIG. 1 shows an exemplary embodiment of a device 10 for carrying out the method according to the present invention. The device 10 shown is a steering device. The steering device 10 comprises a steering path 14, which is arranged between a steering wheel 20 and a vehicle wheel 18 for controlling the vehicle wheel 18. For automated driving, the device 10 comprises an automated driving control device 22, via which control specification values are generated. The automated driving control device 22 thus takes over the driving task of a driver. Via a first communication link 26, the automated driving control device 22 is connected to a control unit 30 of a first control system 34.

The first control system 34 additionally comprises a first actual-value sensor 38, with which the actual values of the steering path 14 can be ascertained. The first actual-value sensor 38 is connected to the first control unit 30 via a signal line 42 so that the actual values can be transmitted to the first control unit 30. The first control system 34 additionally comprises a first controller 46, which is connected to the first control unit 30. The first controller 46 sets the control values, received from the control unit 30, at the steering path 14. In the exemplary embodiment shown, the first controller 46 can be designed as a steering actuator.

The automated driving control device 22 is additionally connected to a control unit 54 of a redundant second control system 58 via a second communication link 50. Via the second communication link 50, the second control unit 54 receives the same control specification values as the first control unit 30. The second control system 58 additionally comprises a second actual-value sensor 62, via which the actual values of the steering path 14 can be detected. For transmitting the actual values to the second control unit 54, a signal line 66 is arranged between the second control unit 54 and the second actual-value sensor 62. The second control unit 54 is additionally connected to a second controller 70 in order to transmit the control values to the second controller 70. The second controller 70 cooperates with the steering path 14 so that the control values can be set at the steering path 14. The second control system 58 can passively run in parallel to the first control system 34 so that it can take over directly in the event of a failure of the first control system 34. It is also possible for the second control system 58 to assist the first control system 34 with steering tasks.

A status line 74 is arranged between the first control unit 30 and the second control unit 54, via which status line the control units 30, 54 can communicate the status to one another. As a result, a defect of one of the control units 30, 54 can be detected in a timely manner.

Figure 2:
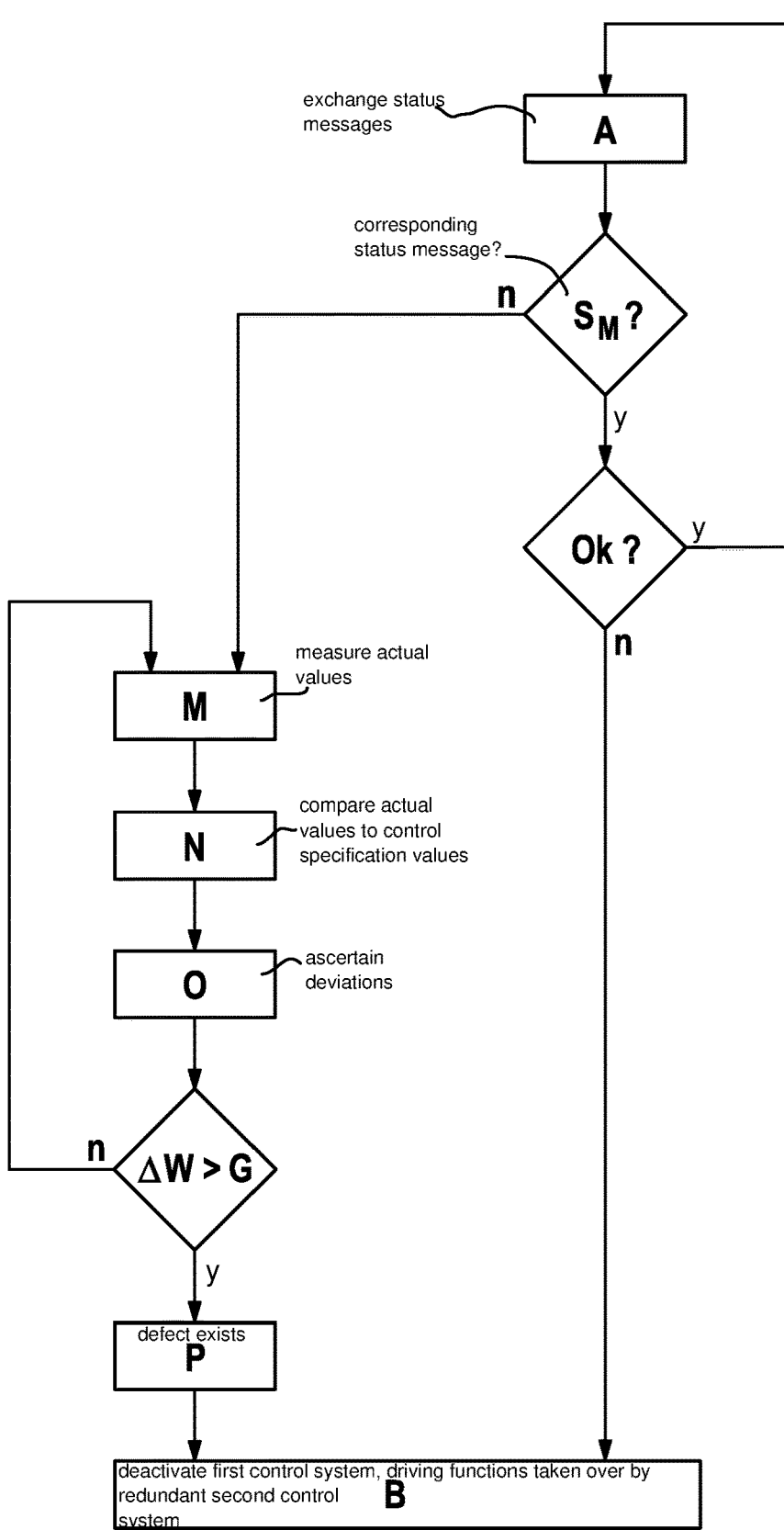
FIG. 2 shows an exemplary embodiment of a method for redundant monitoring of driving functions of an automatedly driving motor vehicle, according to the present invention.

FIG. 2 shows an exemplary embodiment of a method for redundant monitoring of driving functions of an automatedly driving motor vehicle. In a first step A, status messages $S_M$ are exchanged between the control units 30, 54. Subsequently, it is checked in each control unit 30, 54 whether a corresponding status message $S_M$ has arrived. If this is the case, it is then checked whether the status of the respective other control unit 30, 54 indicates that the latter can be operated without errors. If both control units 30, 54 work without errors, the method begins anew.

In the event that a control unit 30, 54 reports a fault, this control unit 30, 54 is deactivated in step B, and the functions of this control unit 30, 54 are possibly taken over by the other control unit 30, 54.

In cases in which a status message $S_M$ of the respective other control unit 30, 54 is missing, redundant monitoring by the respectively other control unit 30, 54 is proposed with this invention. A cause for a missing status message $S_M$ may be a defective status line 74. In redundant monitoring of the driving function, the actual values are measured with the second actual-value sensor 62 in a first step M. In a subsequent step N, the actual values are compared to the control specification values for the second control unit 54. Since the second control unit 54 can be used as a redundant control system 58, control values can also be set at the second controller 70 with the second control unit 54 on the basis of the control specification values. However, due to a control inaccuracy, the actual values may deviate from the control specification values. Accordingly, in a next step O, a deviation $\Delta W$ between the actual values of the second actual-value sensor 62 and the control specification values for the second control unit 54 is ascertained.

Despite a control inaccuracy, the actual values are usually within specified limits $G_W$. If the actual values are within these limits $G_W$, it can be assumed that the first control unit 30 works properly, despite a lack of verifiability via the status line 74. In order to continue to check this, the aforementioned steps are constantly repeated. In the event that the actual values are above the specified limit value $G_W$ during a check, it can be assumed in a next step P that a defect exists in the first control system 34. In a next subsequent step B, the first control system 34 is deactivated and the driving functions are taken over by the redundant second control system 58.

What is claimed is:

1. A method for redundant monitoring of a driving function of an automatedly driving motor vehicle, the motor vehicle including:

a first control system, the first control system including:

a first control unit, a first actual-value sensor, and a first controller, wherein, based on ascertained first actual values of the first actual-value sensor representing a first characterization of an operating state of the motor vehicle and control specification values representing a target vehicle state, the first control unit controls the first controller with control values selected by the first control unit to influence a drive operation of the motor vehicle to transition the vehicle to the target vehicle state from the operating state as characterized by the first characterization, and a redundant second control system including:

a second control unit, a second actual-value sensor, and a second controller, wherein the second controller is controllable by the second control unit using control values ascertained based on ascertained second actual values of the second actual-value sensor representing a second characterization of the operating state of the motor vehicle and the control specification values to influence the drive operation of the motor vehicle to transition the vehicle from the operating state as characterized by the second characterization to the target vehicle state, as the target vehicle state is ascertained by the second control system from the control specification values, wherein the method comprises the following steps performed by the redundant second control system:

after the first control unit has performed the control of the first controller, measuring, using the second actual-value sensor, a further set of the second actual values representing a third characterization of the operating state of the motor vehicle;

comparing a third characterization of the operating state of the motor vehicle to the target vehicle state as ascertained by the second control system from the control specification values, thereby determining a deviation between the third characterization of the operating state and the target vehicle state as ascertained by the second control system from the control specification values; and ascertaining a defect in the first control system when the deviation is above a specified limit value.

2. The method according to claim 1, wherein, after ascertaining the defect, the first control system is deactivated and the driving function is taken over by the redundant second control system.

3. The method according to claim 1, wherein the second control system assists the first control system in adjusting the control values for predetermined driving tasks.

4. The method according to claim 1, wherein, when the second control unit does not receive a status message from the first control unit and the deviation between the third characterization of the operating state and the target vehicle state, as ascertained by the second control system from the control specification values, continues to be below the defined limit value, a defect of a status line between the first and the second control unit is deduced.

5. The method according to claim 1, wherein a status message of the first and second control units is continuously transmitted via a status line between the first and the second control unit so that a defect of the first or second control unit can be detected.

6. A vehicle system of an automatedly driving motor vehicle, the system being configured for redundant monitoring of a driving function of the automatedly driving motor vehicle, the vehicle system comprising:

a first control system including a first control unit, a first actual-value sensor, and a first controller, wherein the first control system is configured such that, during operation of the vehicle system, the first control unit performs a control, the control being:

the first control unit controlling the first controller with control values, selected by the first control unit based on ascertained first actual values of the first actual-value sensor representing a first characterization of an operating state of the motor vehicle and control specification values representing a target vehicle state, to influence a drive operation of the motor vehicle to transition the vehicle to the target vehicle state from the operating state as characterized by the first characterization; and a redundant second control system including a second control unit, a second actual-value sensor, and a second controller, the second controller being:

controllable by the second control unit using control values ascertained based on ascertained second actual values of the second actual-value sensor representing a second characterization of the operating state of the motor vehicle and the control specification values to influence the drive operation of the motor vehicle to transition the vehicle from the operating state as characterized by the second characterization to the target vehicle state, as the target vehicle state is ascertained by the second control system from the control specification values;

wherein the redundant second control system is configured to:

after the first control unit has performed the control of the first controller, measure, using the second actual-value sensor, a further set of the second actual values representing a third characterization of the operating state of the motor vehicle;

compare a third characterization of the operating state of the motor vehicle to the target vehicle state as ascertained by the second control system from the control specification values, thereby determining a deviation between the third characterization of the operating state and the target vehicle state as ascertained by the second control system from the control specification values; and ascertain a defect in the first control system when the deviation is above a specified limit value.

7. The device according to claim 6, wherein the first and second control systems are control systems for a steering, or a brake, or a drive.

\* \* \* \* \*